Oct. 16, 1923.

H. A. HOUSE, JR

WHEEL

Filed March 26, 1919

Inventor:
Henry A House Jr
by Clarence S. Walker
Attorney

Oct. 16, 1923.

H. A. HOUSE, JR

WHEEL

Filed March 26, 1919

Inventor:
Henry A. House Jr.
by Clarence S. Walker
Attorney.

Patented Oct. 16, 1923.

1,471,161

UNITED STATES PATENT OFFICE.

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Application filed March 26, 1919. Serial No. 285,203.

*To all whom it may concern:*

Be it known that I, HENRY A. HOUSE, junior, a citizen of the United States, and resident of Buffalo, Erie County, State of New York, have invented certain new and useful Improvements in Wheels, of which the following is a specification.

This invention relates to improvements in wheels and particularly in wheels designed for sustaining heavy loads, as in the case of wheels used on automobile trucks and similar heavy road vehicles.

One object of this invention is to provide a strong wheel of the disk type with a minimum number of parts and maximum amount of strength.

Another object of this invention is to provide a rim and intermediate unit which can be substituted for the rim and spokes of a wood wheel without any change in the hub construction or any change in the center line of the tread.

Further objects of this invention will appear from a consideration of the specification and of the drawings annexed thereto which form a part thereof and in which—

Figure 1:
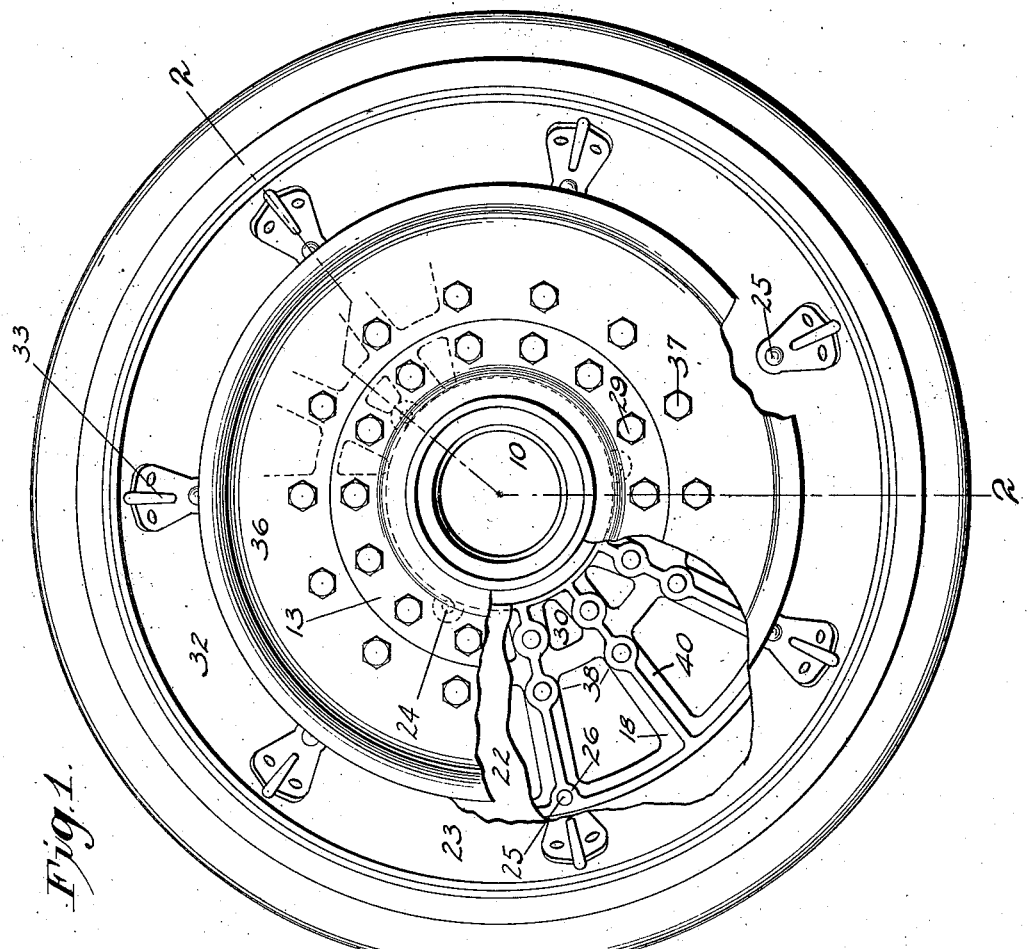
Fig. 1, is a side view partly broken away of a rear wheel embodying this invention.
Figure 2:
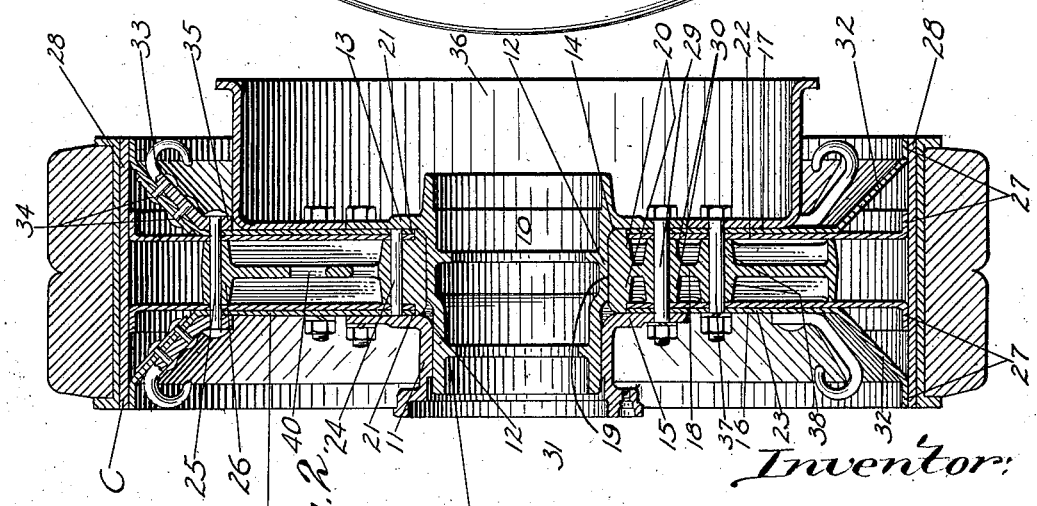
Fig. 2, is a section taken along the line 2—2 of Fig. 1.

This invention relates to a wheel comprising a hub unit A, an intermediate unit B, and a rim unit C.

The hub unit A is of the usual form and comprises the main hub member 10 and the clamping sleeve or nut 11. The main member has a cylindrical portion 12, over which slides the sleeve 11, and has also a radial flange 13 which has a curved juncture 14 with the hub member 10. On the clamping sleeve 11 is a flange 15 which corresponds to the flange 13 and these flanges serve to hold the intermediate unit B in position.

This description of the hub unit applies to the various embodiments of this invention shown in the drawing. The difference between these embodiments rests in the form of intermediate unit B and rim unit C employed. These various embodiments will, therefore, be separately discussed in detail.

Referring to the drawings the intermediate unit B comprises two sets of circular disks 16 and 17 separated and supported by a circular spider 18. The spider 18 has at its center an annular opening 19, the diameter of which is substantially the same as the outside diameter of the cylindrical portion 12 of the hub member 10.

The spider 18 has integral flanges 20 around the opening 19. These flanges form seats 21 for the sets of disks 16 and 17 and are rounded at the edges to correspond to the curve 14 of the flange 13. The width of each flange 20 is the same as the thickness of the set of disks supported by the spider 7. Openings are cut in the spider to reduce weight as much as possible without affecting its strength and to provide radially extending ribs 40.

The sets 16 and 17 here shown comprise two disks 22 and 23 each of which has a center opening so that they can be slipped over and seated on the flanges 20. The disks so seated are firmly fastened to the spider 18 by any suitable means. As here shown the disks are clamped by rivets 24 through the spider near the central opening 19 and by bolts or rivets 25 through bosses 26 at the ends of the ribs 40.

The disks are turned at their edges to form annular flanges 27 on which the rims 28 of the rim unit C are secured in any desired manner such as by spot welding.

The rim, disks and spider are thus firmly secured together and can be handled as a single member. The width of this member, where it engages the hub, is the same as that of a wooden wheel, and the center line is the same so that the substitution of this member for a wooden wheel does not change the tread.

Furthermore, as will be pointed out below, the member is adapted to be secured in place by the same means as a wooden wheel. It can, therefore, be substituted for a wooden wheel without any change in the hub construction.

When assembling the united intermediate unit and rim are slipped over the cylindrical portion 12 of the hub against the flange 13. The rounded edge of the spider engages the curved juncture 14 as do the curved hilts of the wooden spokes. The clamping sleeve 11 is now slid over the hub member and the flange 15 is placed against the intermediate unit. The usual bolts 29 connecting the flanges 13 and 15 pass through the disks and spider and clamp the intermediate member in place. Bosses 30, throughout which the bolts 29 pass, are formed on the spider to hold the disks 16 and 17 against compression.

The construction and assembly so far described applies to both front and rear wheels. These wheels, however, differ somewhat in certain essential details and will be considered separately.

The rear wheel 31 is provided with a double tire and in order to firmly hold the wide rim the outer disks 23 are bent outward at an angle of approximately 45° beyond the periphery of the spider 18 as shown at 32. The inclined portions 32 brace the outer edges of the rim against side shock and are secured to it through the flange 27 as described above.

Hooks 33 for tire chains are riveted to the inclined portions 32 as at 34, supplemental stiffening plates being provided, and in addition the clamping bolts 25 pass through the inner ends 35 of the hooks so that they are firmly held in place.

Fastened to the wheel 31 is a brake drum 36 which fits over the flanges 13 and between the flanges and the inner ends 35 of the hook. The drum is secured to the intermediate unit B in the usual manner by bolts 37 which pass through the disks and spider, bosses 38 similar to bosses 30, being provided on the spider.

The rear member comprising the intermediate unit and rim is, therefore, symmetrical and reversible, except for the brake drum which, as will be noted, can be secured equally well to either side of the intermediate member. This construction permits a reversal of the wheel, as for example when the wear due to road conditions is practically all on one side of the tire.

Figure 3:
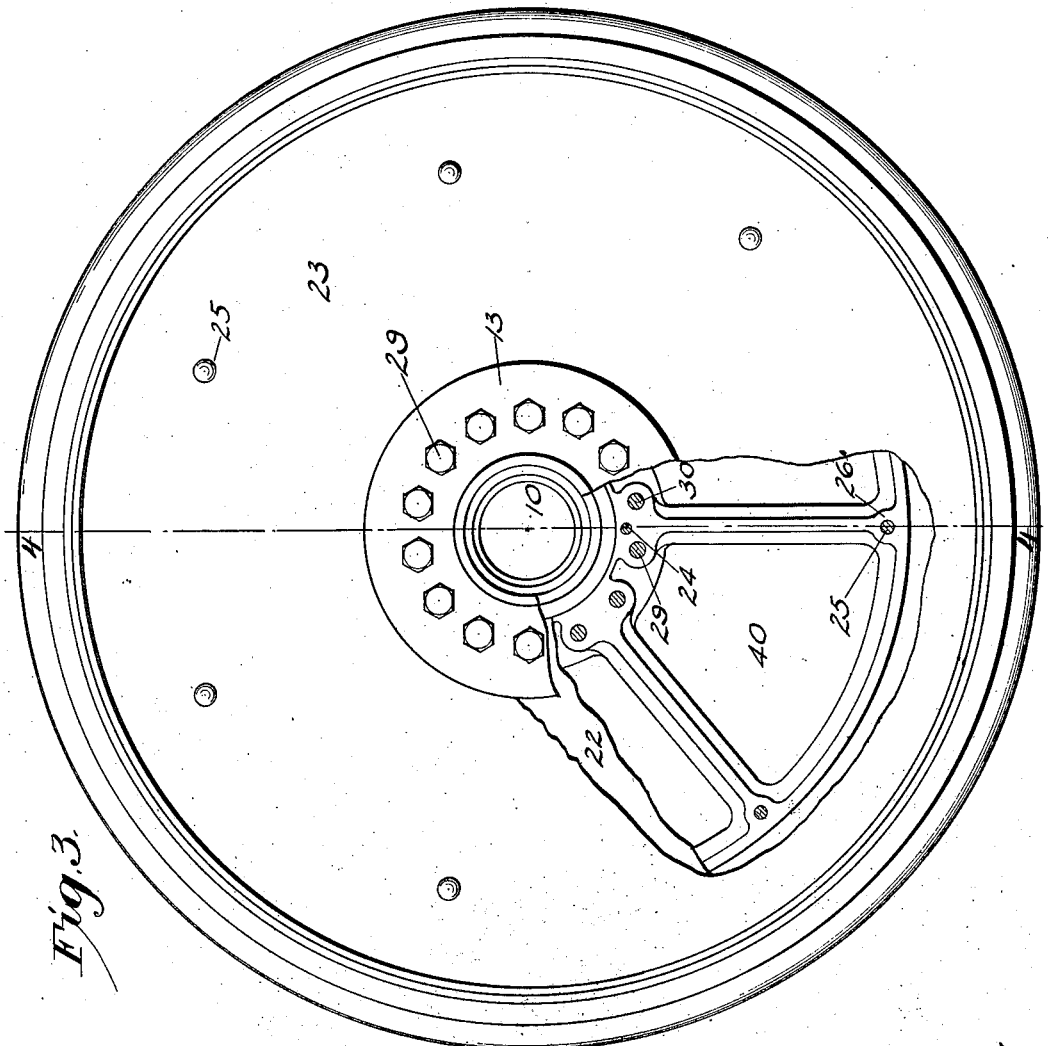
Fig. 3, is a side view similar to Fig. 1 of a front wheel embodying this invention.
Figure 4:
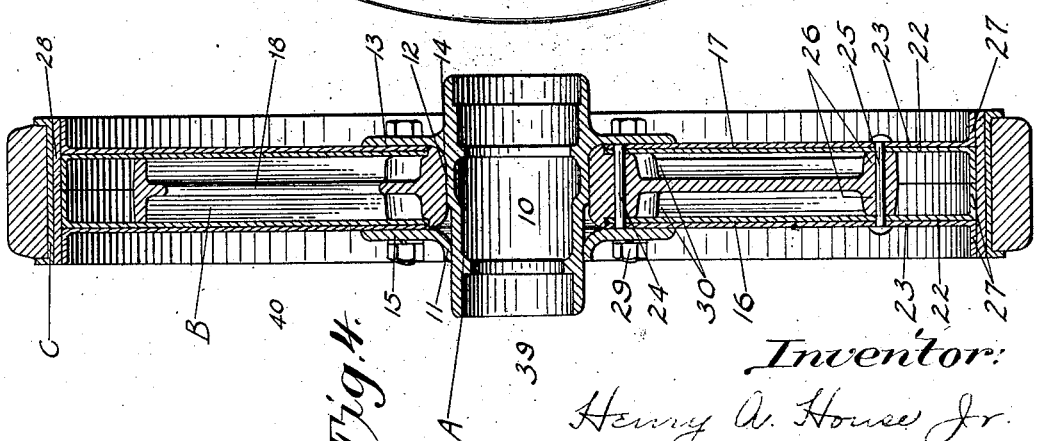
Fig. 4, is a section taken along the lines 4—4 of Fig. 3.

In the front wheel 39 as shown in Figures 3 and 4 the disks 22 and 23 are identical and interchangeable. Upon assembling the inner disks 22 are arranged with the flanges 27 inward while the outer disks 23 are arranged with the flanges outward. The number of different parts is thus reduced and the rim 28 is supported throughout its inner surface.

While certain forms only of this invention have been shown and described it will be understood that I do not desire to be limited thereto but wish to cover all other embodiments that come within the spirit and scope of my invention as set forth in the annexed claims.

I claim:

1. A wheel comprising in combination a hub, a rim, a plurality of disks joined to said rim, means separating said disks into two sets, said means contacting with the disks at the hub and along a circumferential line intermediate the hub and the rim means fastening said disks to said separating means and bolts clamping said hub, disks and separating means together.

2. A wheel comprising in combination a hub, a rim, a plurality of disks joined to said rim, means separating said disks into two sets, said means including a plurality of radially extending ribs to which said disks are secured and a ring at the outer ends of said ribs, means fastening said disks to said separating means and bolts clamping said hub, disks and separating means together.

3. In a wheel, an intermediate unit joining the wheel rim to the hub and comprising an annular member adapted to slip over the hub, disks seated upon and fastened to said member, and radially extending ribs separating said disks, said ribs being secured adjacent to their outer end to said disks.

4. A wheel having in combination a hub unit, a rim unit, an intermediate unit comprising a circular spider, a plurality of disks at each side of said spider and secured to said rim unit and means clamping said disks and spider to said hub unit.

5. A wheel having in combination a hub unit, said unit comprising a member having a cylindrical portion and a flange projecting radially therefrom and an annular clamping member slidable over the cylindrical portion of the first member and having a radial flange, an intermediate unit comprising an annular spider slidable over the cylindrical portion of the first hub unit member, and two sets of disks secured one at each side of said spider, each of said disks at its outer edge being provided with an annular flange, said intermediate unit being positioned on the cylindrical portion of the hub unit member between and secured to the flanges of said unit, and a rim unit positioned upon and secured to the annular flanges of the disks of said intermediate unit.

6. A wheel having in combination a hub unit and an intermediate unit, said intermediate unit comprising a spider having annular rows of bosses, a plurality of disks arranged at each side of said spider having annular rows of holes corresponding to said annular rows of bosses and clamping means passing through said inner and outer rows of holes and bosses to rigidly secure said spider and disks together, said hub unit having radial flanges extending each side of said intermediate unit and having an annular row of holes corresponding to the mediate rows of bosses on said spider and the mediate row of holes in said disks and clamping means extending through said mediate rows of bosses and holes rigidly securing said hub and intermediate units together a rim unit and means securing said rim to said disks.

7. A wheel having in combination a hub, a spider mounted thereon, two disks secured to each side of said spider annular flanges at the outer edges of said disks and a rim secured to said flanges, each outer disk having an annular outwardly inclined portion below the flange to brace the rim against side shock.

8. A wheel having in combination a hub, a spider mounted thereon, two disks secured to each side of said spider, annular flanges at the outer edges of said disks, a rim secured to said flanges, each outer disk having an annular outwardly inclined portion below the flange to brace the rim against side shock and hooks mounted on said inclined portions.

9. An intermediate wheel unit comprising a circular spider having a central annular opening, flanges on said spider around said opening, circular disks seated on said flanges at each side of said spider, bosses on said spider against which said disks rest and means passing through said disks and said bosses for securing said disks in place upon said spider.

10. A wheel having in combination a hub unit, an intermediate unit mounted thereon, said unit comprising a spider and two disks on each side of and secured to said spider, said disks having annular flanges at their periphery, the flanges of the inner disks on each side of the spider being inward and the flanges on the outer disk on each side of the spider being outward, and a rim unit carried by and fastened to said flanges.

11. An intermediate unit comprising a spider and four interchangeable disks mounted thereon, two on each side, said disks having annular perpendicular flanges at their periphery, each flange being one half the width of said spider, the flanges on the disks adjacent to the spider extending inward and meeting and the flanges on the other disks extending outward whereby the four flanges form a continuous cylindrical surface at right angles to the faces of the disks.

12. In a wheel structure, the combination of a spider member provided with radial arms and a pair of oppositely extending central annular flanges, a pair of wheel discs connected to said spider with their inner edges engaging said flanges and contacting with the edges of said arms, and a rim carried by said discs.

In testimony whereof I affix my signature.
HENRY A. HOUSE, Jr.